United States Patent [19]
Okamoto et al.

[11] Patent Number: 5,889,569
[45] Date of Patent: Mar. 30, 1999

[54] DEVICE USED FOR LIQUID CRYSTAL DISPLAY

[75] Inventors: Mamoru Okamoto; Takahiko Watanabe, both of Tokyo, Japan

[73] Assignee: NEC Corporation, Japan

[21] Appl. No.: 594,233

[22] Filed: Feb. 23, 1996

[30]     Foreign Application Priority Data

Feb. 24, 1995 [JP] Japan .................................. 7-062035

[51] Int. Cl.⁶ ................................................. G02F 1/1333
[52] U.S. Cl. ........................................... 349/110; 349/153
[58] Field of Search ..................................... 349/153, 110

[56]         References Cited
        FOREIGN PATENT DOCUMENTS

| 57-99614 | 6/1982 | Japan | G02F 1/133 |
|---|---|---|---|
| 61-215525 | 9/1986 | Japan | G02F 1/133 |
| 62-46431 | 3/1987 | Japan | G02F 1/133 |
| 2-87116 | 3/1990 | Japan | G02F 1/1335 |
| 4-141623 | 5/1992 | Japan | G02F 1/1335 |
| 5-72540 | 3/1993 | Japan | 349/153 |
| 572540 | 3/1993 | Japan | G02F 1/1339 |
| 5-265009 | 10/1993 | Japan | G02F 1/1339 |

*Primary Examiner*—William L. Sikes
*Assistant Examiner*—James A. Dudek
*Attorney, Agent, or Firm*—Hayes, Soloway, Hennessey, Grossman & Hage, P.C.

[57]          ABSTRACT

The invention provides a device to be used for a liquid crystal display including (a) a pair of substrates A and B facing to each other, (b) a plurality of electrodes formed in electrical connection with the substrate A, (c) sealing material for adhesively connecting the substrates A and B at margins thereof to each other so that the substrates A and B are spaced away from each other, (d) liquid crystal filled in a space formed between the substrates A and B, and (e) black matrix formed on the substrate B. The black matrix is formed with at least one opening so that the sealing material can make direct contact with a surface of said substrate B, the opening having a width smaller than a width of the electrodes.

13 Claims, 3 Drawing Sheets

DEVICE USED FOR LIQUID CRYSTAL DISPLAY

BACKGROUND OF THE INVENTION

1. Field of the Invention

The invention relates to a device to be used for a liquid crystal display (LCD), and more particularly to such a device capable of color-display.

2. Description of the Related Art

A part of a conventional device to be used for a liquid crystal display is illustrated in FIGS. 1A to 1C; FIG. 1A is a plan view of a device, FIG. 1B is a cross-sectional view taken along the line I—I in FIG. 1A, and FIG. 1C is a cross-sectional view taken along the line II—II in FIG. 1A.

With reference to FIG. 1C, a pair of substrates 1 and 2 are first adhesively connected to each other at margins thereof through sealing material 3 such as an adhesive so that the substrates 1 and 2 are spaced away from each other in parallel with each other. The thus connected substrates 1 and 2 are baked, and then liquid crystal 4 is filled in a space formed between the substrates 1 and 2, thereby a device to be used for a liquid crystal display being completed. In practice, in order to obtain a controlled width of the liquid crystal layer, a filler is contained in both the sealing material 3 and the liquid crystal layer.

On inner surfaces of the substrates 1 and 2 are formed various layers. On an inner surface of the substrate 1 are formed a display pixel electrode array 5 to be driven by a thin film transistor, and an orientation film 6 over the electrode array 5. The orientation film 6 is a film having been rubbed in order to control molecular orientation of the liquid crystal 4. In a margin of the substrate 1 are disposed terminal electrodes 7 drawn out beyond the sealing material 3 for use of driving modules.

On an inner surface of the substrate 2 disposed in facing relation to the substrate 1 are formed color filter layers 8 in alignment with the electrode array 5. The color filter layers 8 include three layers for red (R), green (G) and blue (B) (only R is illustrated in FIG. 1C). Among the color filter layers are formed black matrices or light-impermeable patterns 9. The black matrix disposed at the margin extends between the color filter layer and the sealing material 3. The color filter layers 8 and the black matrices 9 are covered with an overcoat layer 10 in order to prevent ingredients of the color filter layers 8 from penetrating the liquid crystal 4, and enhance flatness of surfaces of the color filter layers 8.

Over the overcoat layer 10 is formed a common electrode 11. Similarly to the substrate 1, the substrate 2 includes the orientation film 6 formed over the common electrode 11.

Various attempts have been made in prior art to increase adhesive strength between the substrates 1 and 2 through the sealing material 3.

For instance, Japanese Unexamined Patent Publication No. 57-99614 has suggested using electrodes made of glass because adhesive strength between the sealing material and glass is greater than adhesive strength between the sealing material and polyimide or ITO (Indium-Tin-Oxide).

For another instance, Japanese Unexamined Patent Publication No. 4-141623 has suggested a liquid crystal panel including a pair of substrates. Color filter layers are formed on one of the substrates, and there is also formed an overcoat layer which covers at least a surface of the color filter layers except portions at which sealing material is to be adhered. Namely, the overcoat layer is not formed beneath a region at which the sealing material is to be adhered.

Japanese Unexamined Patent Publication No. 5-265009 has proposed a device to be used for a liquid crystal display in which an overcoat layer is patterned, and with no overcoat layer or ITO located beneath the region at which the sealing material is to be adhered, thereby increasing adhesive strength between substrates facing each other and an adhesive layer.

Japanese Unexamined Patent Publication No. 2-87116 has suggested a color filter substrate to be used for a liquid crystal display in which transparent electrodes are partially cut out at portions through which transparent electrodes and sealing material are adhesively connected to each other, thereby increasing accuracy of surfaces of the substrates and the sealing material through which they are adhered to each other, sealing performance, and adhesive strength.

As best shown in FIG. 1C, the sealing material composed of epoxy resin, for instance, is usually in partial contact with black matrix (usually composed of chromium) formed on a color filter substrate. In general, the adhesive force between epoxy resin and chromium is weaker than the adhesive force between epoxy resin and glass. Thus, long term use of a liquid crystal display weakens the adhesive force between epoxy resin and chromium with the result of less reliability.

In addition, if glass is used as underlying material beneath a region at which epoxy resin is to be adhered, incident light emitted from back light may escape outside through marginal sealing areas, which are composed of glass and hence transparent, with a resulting deterioration of display performance.

SUMMARY OF THE INVENTION

In view of foregoing problems of prior devices, it is an object of the present invention to provide a device to be used for a liquid crystal display, which device has an increased adhesive strength at marginal sealing portions and hence higher reliability.

The present invention provides a device to be used for a liquid crystal display including (a) a pair of substrates A and B facing to each other, (b) a plurality of electrodes formed in electrical connection with the substrate A, (c) sealing material for adhesively connecting the substrates A and B at margins thereof to each other so that the substrates A and B are spaced away from each other, (d) liquid crystal filled in a space formed between the substrates A and B, and (e) black matrix formed on the substrate B, the black matrix being formed with at least one opening so that the sealing material can make direct contact with a surface of the substrate B, the opening having a width smaller than a width of the electrodes.

The present invention further provides a device to be used for a liquid crystal display including (a) a pair of substrates A and B facing to each other, (b) a plurality of electrodes formed in electrical connection with the substrate A, (c) sealing material for adhesively connecting the substrates A and B at margins thereof to each other so that the substrates A and B are spaced away from each other, the sealing material containing light-impermeable pigment dispersed therein, (d) liquid crystal filled in a space formed between the substrates A and B, and (e) black matrix formed on the substrate B, the black matrix being formed with at least one opening so that the sealing material can make direct contact with a surface of the substrate B, the opening having a width smaller than a width of the electrodes.

In a preferred embodiment, the black matrix is formed with the same number of openings as that of the electrodes. The opening or openings is (are) preferably in alignment with one or each of the electrodes.

In another preferred embodiment, the width of the opening is determined in dependence on a tolerance required when the substrates A and B are positioned in alignment with each other. For instance, the width W1 of the opening is determined in accordance with the following equation:

$$W1=W2-2T$$

wherein W2 is the width of the electrodes, and T is a tolerance required when the substrates A and B are positioned in alignment with each other.

The opening or openings may be shaped in any form, provided that it or they ensure(s) that the sealing material can make direct contact with a surface of one of the substrates. For instance, the opening or openings may be circular, triangular, rectangular or polygonal in shape. The opening or openings is (are) preferably a slit or slits in shape.

As the light-impermeable pigment is used black pigment such as carbon black.

In accordance with the invention, there are formed openings, preferably slits, in the black matrix in alignment with the electrodes in a region at which the sealing material is in adhesive contact with a substrate. The openings or slits have a width smaller than a width of the electrodes. By providing black matrix with the openings or slits so that the sealing material can make direct contact with a surface of the substrate, it is possible to increase adhesive strength in the above mentioned region with the result of higher reliability.

In addition, in accordance with the invention, the sealing material contains light-impermeable pigment such as carbon black dispersed therein. Hence, even if the substrates are located in misalignment with each other to thereby form a gap therebetween, back light is absorbed into the light-impermeable pigment dispersed in the sealing material, and thus it is possible to prevent light leak from the display.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1A:
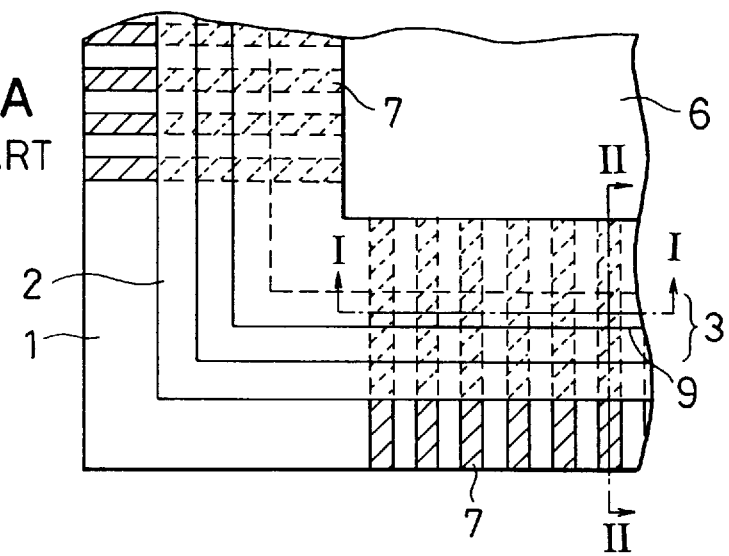
FIG. 1A is a partial plan view illustrating a conventional device to be used for a liquid crystal display.
Figure 1B:
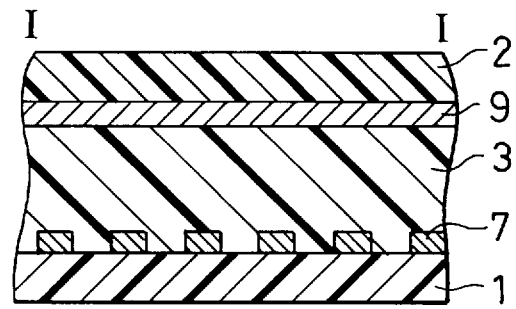
FIG. 1B is a cross-sectional view taken along the line I—I in FIG. 1A.
Figure 1C:
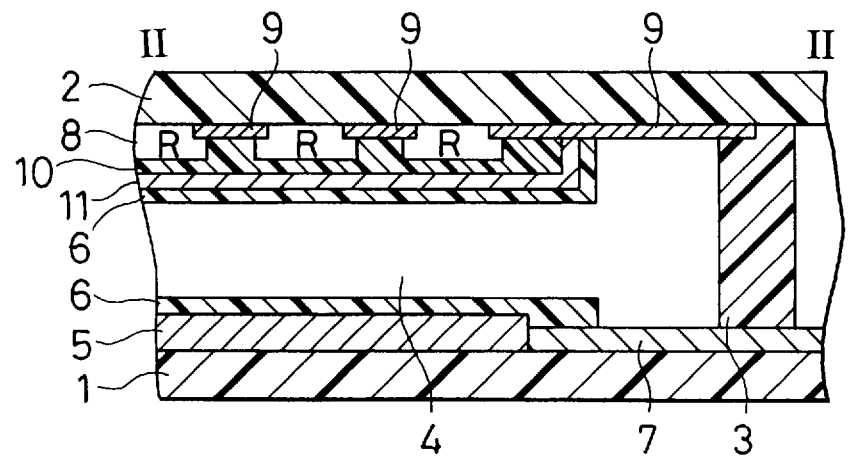
FIG. 1C is a cross-sectional view taken along the line II—II in FIG. 1A.
Figure 2A:
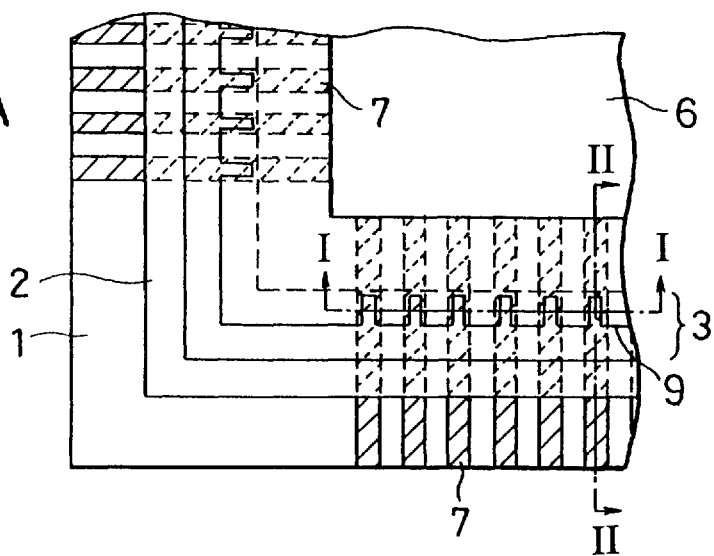
FIG. 2A is a partial plan view illustrating a device to be used for a liquid crystal display, made in accordance with an embodiment of the present invention.
Figure 2B:
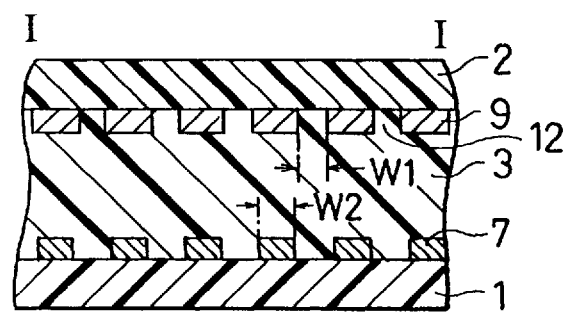
FIG. 2B is a cross-sectional view taken along the line I—I in FIG. 2A.
Figure 2C:
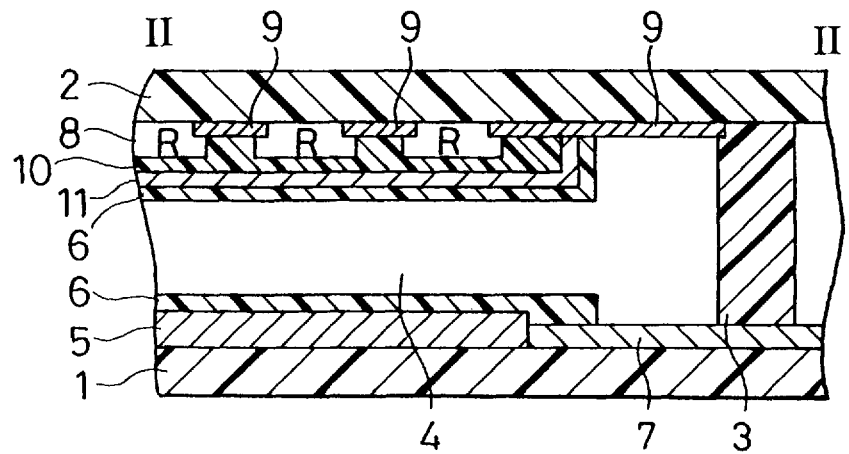
FIG. 2C is a cross-sectional view taken along the line II—II in FIG. 2A.

FIGS. 2A to 2C illustrate a device made in accordance with the first embodiment of the present invention. Comparing to a conventional device illustrated in FIGS. 1A to 1C, the device is different from the conventional one in configuration of black matrix formed on a substrate on which color filter layers are also formed.

With reference to FIGS. 2A to 2C, substrates 1 and 2 made of glass are processed to have a predetermined thickness, and then are adhered to each other through sealing material 3 such as epoxy resin so that the substrates 1 and 2 are spaced away from each other by a certain distance. The thus connected substrates 1 and 2 are then baked. Then, liquid crystal 4 such as nematic mixed liquid crystal is filled in a space formed between the substrates 1 and 2. Processing for orientation and material of which liquid crystal is composed are different in accordance with modes of liquid crystal operation. In the first embodiment, they are determined in accordance with normal twist nematic operation mode. The liquid crystal 4 is controlled to have a thickness of about 5 $\mu$m.

On the substrate 1 is formed a display pixel electrode array 5 comprising a thin film transistor composed of amorphous silicon and a display electrode pixel composed of ITO to which the thin film transistor is electrically connected. Over the electrode array 5 is deposited polyimide resin. After baking the substrate 1, there is formed a rubbed orientation film 6 over the electrode array 5.

On the substrate 2 is deposited black matrix 9 composed of metal chromium, and then the black matrix 9 is patterned. Over the black matrix 9 is formed color filter layers 8 in alignment with each of the display pixel electrodes. As mentioned earlier, the color filter layers 8 comprises three layers for red (R), green (G) and blue (B) (only R is illustrated in FIG. 2C). Then, the device is entirely covered with an overcoat layer 10 and a common electrode 11 except at a region at which the sealing material 3 is to be adhered.

Hereinbelow is explained the configuration of the black matrix 9. As illustrated in FIG. 2B, the black matrix 9 is formed with slits 12 in alignment with the electrode 7 formed on the substrate 1 at marginal areas thereof. Each of the slits 12 extends in parallel with the electrodes 7. In the first embodiment, there are formed the same number of the slits 12 as the number of the electrodes 7. However, it should be noted that the smaller number of the slits 12 may be formed than the number of the electrodes 7. What is necessary is to form at least one slit 12 in alignment with one of the electrodes 7.

The electrodes 7 are composed of light-impermeable metal such as chromium (Cr). The black matrix 9 extends intermediate a width of the sealing material 3, namely, the black matrix 9 partially overlaps the sealing material 3.

Each of the slits 12 has a width W1 smaller than a width W2 of the electrodes 7. The width W1 of the slit 12 may be determined in accordance with many factors. For instance, the width W1 of the slit 12 may be determined in dependence on a tolerance T required when the substrates 1 and 2 are positioned in facing alignment with each other. For instance, the width W1 of the slit 12 may be determined in accordance with the following equation:

$$W1=W2-2T$$

Provided that the electrode 7 has the width W2 of about 100 $\mu$m and that the tolerance T is ±6 $\mu$m, the width W1 of the slit 12 may be determined to be 88 $\mu$m. Thus, even if the substrate 1 is in maximum misalignment with the substrate 2, the slit 12 is always in alignment with the associated electrode 7.

By forming the slits 12, the sealing material 3 can make direct contact with a surface of the substrate 2 with the result of wider contact area of the sealing material 3 to the glass substrate 2. Thus, there can be obtained greater adhesive strength between the substrates 1 and 2 than an arrangement in which there are formed no slits and hence the sealing material 3 is in contact with a surface of the substrate 1 in smaller area than the embodiment.

In order to confirm reliability of the device manufactured in accordance with the above mentioned first embodiment, there was conducted a test with respect to operation of the device under high temperature and high humidity. Both a conventional device and the device fabricated in accordance with the first embodiment were operated for 1000 hours at 60° C. at relative humidity of 85%. The conventional device showed fraction defective of about 3%, whereas the device fabricated in accordance with the first embodiment showed zero fraction defective.

Figure 3:
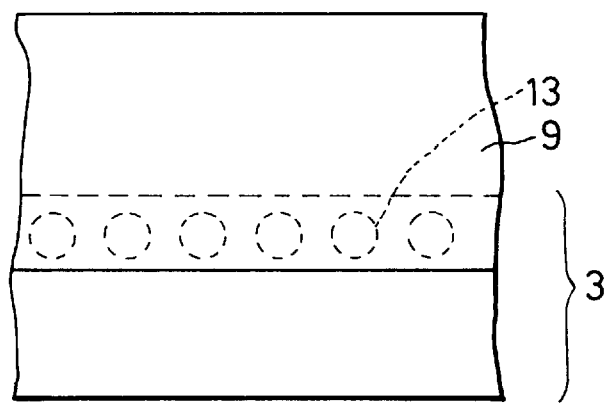
FIG. 3 is a partial plan view illustrating another example of openings to be formed in black matrix.

In the first embodiment, the black matrix 9 is formed with the slits 12. As an alternative to the slits 12, there may be formed an opening or openings in any shape, provided that such opening or openings ensure(s) that the sealing material 3 can make direct contact with a surface of the substrate 1. For instance, there may be formed circular openings 13 in place of the slits, as illustrated in FIG. 3. The openings may be triangular, rectangular or polygonal in shape. However, it should be noted that the openings are configured most preferably in slits.

Hereinbelow will be explained the second embodiment in accordance with the present invention. The second embodiment has the same structure as that of the first embodiment except that filler dispersed in the sealing material is different from that of the first embodiment. The sealing material 3 in the first embodiment contains therein glass fibers as filler similarly to a conventional one, whereas the sealing material in the second embodiment contains therein light-impermeable organic pigment, for instance, black pigment such as carbon black.

In accordance with the second embodiment, even if the substrates 1 and 2 are located in misalignment with each other to thereby form a gap therebetween, back light is absorbed by the light-impermeable pigment such as carbon black dispersed in the sealing material 3, and thus it is possible to prevent light from leaking to a display.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A liquid crystal display comprising:

first and second glass substrates facing each other;

a plurality of spaced electrodes formed on said first glass substrate with openings between the electrodes;

sealing material adhesively connecting said first and second glass substrates at margins thereof to each other with said first and second glass substrates spaced from each other;

liquid crystal filled in a space formed between said first and second glass substrates; and black matrix formed on said second glass substrate, said black matrix being formed with at least one slit so that said sealing material can make direct contact with a surface of said second glass substrate, said slit having a width smaller than a width of said electrodes.

2. The liquid crystal display as set forth in claim 1, wherein said black matrix is formed with the same number of openings as that of said electrodes.

3. The liquid crystal display as set forth in claim 1, wherein said slit is in alignment with one of said electrodes.

4. The liquid crystal display as set forth in claim 2, wherein said slits are in alignment with each of said electrodes.

5. The liquid crystal display as set forth in claim 1, wherein said width of said slit is dependent on a tolerance required when said first and second glass substrates are positioned in alignment with each other.

6. The liquid crystal display as set forth in claim 5, wherein said width of said slit is determined in accordance with the following equation:

$$W1 = W2 - 2T$$

wherein $W1$ is said width of said slit, $W2$ is said width of said electrodes, and $T$ is a tolerance required when said first and second glass substrates are positioned in alignment with each other.

7. A liquid crystal display comprising:

first and second glass substrates facing each other;

a plurality of spaced electrodes formed on said first glass substrate with openings between the electrodes;

sealing material adhesively connecting said first and second glass substrates at margins thereof to each other with first and second glass substrates spaced from each other, said sealing material containing light-impermeable pigment dispersed therein;

liquid crystal filled in a space formed between said first and second glass substrates; and black matrix formed on said second glass substrate, said black matrix being formed with at least one slit so that sealing material can make direct contact with a surface of said second glass substrate, said slit having a width smaller than a width of said electrodes.

8. The liquid crystal display as set forth in claim 7, wherein said light-impermeable pigment comprises carbon black.

9. The liquid crystal display as set forth in claim 7, wherein said black matrix is formed with the same number of openings as that of said electrodes.

10. The liquid crystal display as set forth in claim 7, wherein said slit is in alignment with one of said electrodes.

11. The liquid crystal display as set forth in claim 9, wherein said slits are in alignment with each of said electrodes.

12. The liquid crystal display as set forth in claim 7, wherein said width of said slit is dependent on a tolerance required when said first and second glass substrates are positioned in alignment with each other.

13. The liquid crystal display as set forth in claim 12, wherein said width of said slit is determined in accordance with the following equation:

$$W1 = W2 - 2T$$

wherein $W1$ is said width of said slit, $W2$ is said width of said electrodes, and $T$ is a tolerance required when said first and second glass substrates are positioned in alignment with each other.

* * * * *